United States Patent
Kannan et al.

(10) Patent No.: US 10,151,504 B2
(45) Date of Patent: Dec. 11, 2018

(54) MOBILE DEVICE FOR BUILDING CONTROL WITH ADAPTIVE USER INTERFACE

(71) Applicant: Honeywell International Inc., Morris Plains, NJ (US)

(72) Inventors: Kamal Kannan, Maduri (IN); Philip J. Ferro, Setauket, NY (US)

(73) Assignee: Honeywell International Inc., Morris Plains, NJ (US)

(*) Notice: Subject to any disclaimer, the term of this patent is extended or adjusted under 35 U.S.C. 154(b) by 274 days.

(21) Appl. No.: 15/140,926

(22) Filed: Apr. 28, 2016

(65) Prior Publication Data
US 2017/0314804 A1    Nov. 2, 2017

(51) Int. Cl.
F24F 11/00    (2018.01)
F24F 11/30    (2018.01)
G05B 15/02   (2006.01)
G06F 3/0481  (2013.01)
G06F 3/0482  (2013.01)
(Continued)

(52) U.S. Cl.
CPC .......... *F24F 11/0086* (2013.01); *F24F 11/30* (2018.01); *G05B 15/02* (2013.01); *G06F 3/0482* (2013.01); *G06F 3/04817* (2013.01); *G06F 3/04847* (2013.01); *H04L 12/2825* (2013.01);
(Continued)

(58) Field of Classification Search
CPC ....... F24F 11/0086; F24F 11/30; G05B 15/02; G06F 3/04817; G06F 3/0482; G06F 3/04847; H04W 4/021; H04W 4/04; H04L 12/2825; H04L 67/18
See application file for complete search history.

(56) References Cited

U.S. PATENT DOCUMENTS 7,548,197 B2   6/2009   Gruchala et al.
7,577,922 B2   8/2009   Mann et al.
(Continued)

FOREIGN PATENT DOCUMENTS

WO   WO 2012/079530   6/2012
WO   WO 2012/097636   7/2012
WO   WO 2012/102813   8/2012

OTHER PUBLICATIONS

Extended European Search Report for EP Application No. 17150891.4, dated May 30, 2017.
(Continued)

*Primary Examiner* — Khai M Nguyen
(74) *Attorney, Agent, or Firm* — Seager, Tufte & Wickhem, LLP

(57) ABSTRACT

A wireless device may be used to communicate with and control one or more components of an HVAC system from a remote location. The wireless device may be configured to display building control information on the display of the wireless device, wherein the building control information that is displayed may be adapted based, at least in part, on an identified pattern of user actions with the wireless device. The identified pattern may be at least partially based on user actions with associated geo-locations, times, and/or other conditions. The information that is to be displayed on the display of the wireless device may be determined based, at least in part, on a current time, a current geo-location of the wireless device, or other current condition in view of the identified pattern in user actions.

20 Claims, 10 Drawing Sheets

(51) Int. Cl.
  *G06F 3/0484* (2013.01)
  *H04W 4/021* (2018.01)
  *H04L 12/28* (2006.01)
  *H04W 4/04* (2009.01)
  *H04L 29/08* (2006.01)

(52) U.S. Cl.
  CPC ............ *H04L 67/18* (2013.01); *H04W 4/021* (2013.01); *H04W 4/04* (2013.01)

(56) References Cited

U.S. PATENT DOCUMENTS

| | | | |
|---|---|---|---|
| 7,617,197 | B2 | 11/2009 | Stanton et al. |
| 7,624,114 | B2 | 11/2009 | Paulus et al. |
| 7,860,901 | B2 | 12/2010 | Cheng et al. |
| 8,458,102 | B2 | 6/2013 | Bill |
| 9,088,812 | B2 | 7/2015 | Calissendorff |
| 9,900,174 | B2 * | 2/2018 | Gamberini ............ G05B 15/02 |
| 2007/0064477 | A1 | 3/2007 | Dorow et al. |
| 2007/0130522 | A1 | 6/2007 | Mansell et al. |
| 2009/0055765 | A1 * | 2/2009 | Donaldson .......... G05B 19/042 715/771 |
| 2009/0150938 | A1 | 6/2009 | Clancy |
| 2011/0072492 | A1 | 3/2011 | Mohler et al. |
| 2011/0138328 | A1 | 6/2011 | Ge et al. |
| 2011/0191611 | A1 | 8/2011 | Boni Ang et al. |
| 2011/0252318 | A1 | 10/2011 | Helms |
| 2011/0306304 | A1 * | 12/2011 | Forutanpour ....... G06F 3/04883 455/67.11 |
| 2012/0140255 | A1 | 6/2012 | Tanaka |
| 2012/0179999 | A1 | 7/2012 | Nesladek et al. |
| 2012/0319825 | A1 | 12/2012 | Shimy et al. |
| 2014/0128021 | A1 * | 5/2014 | Walker ............. H04W 52/0212 455/405 |
| 2014/0151456 | A1 * | 6/2014 | McCurnin .......... G05D 23/1905 236/51 |
| 2014/0343841 | A1 | 11/2014 | Faaborg et al. |
| 2017/0103327 | A1 * | 4/2017 | Penilla ................... G06N 5/025 |
| 2018/0004178 | A1 * | 1/2018 | Haines .................. G05B 15/02 |
| 2018/0060742 | A1 * | 3/2018 | Penilla ................... G06N 5/025 |

OTHER PUBLICATIONS cydiaupdates.wordpress.com/category/productivity/, "Cydia Updates That Matter," WordPress, 3 pages, printed Jan. 31, 2013.
Bohmer et al., "Exploiting the Icon Arrangement on Mobile Devices as Information Source for Context-Awareness," Munster University of Applied Sciences, 4 pages, Sep. 7-10, 2010.
VBulletin®, "Imgy Widgets," vBulletin Solutions Inc., available at http://www.mobilephonetalk.com/archive/index.php/t-136530.html, 1 page, downloaded Jul. 8, 2012.
Van Setten et al., "Context-Aware Recommendations in the Mobile Tourist Application COMPASS," 10 pages, downloaded Sep. 15, 2015.

* cited by examiner

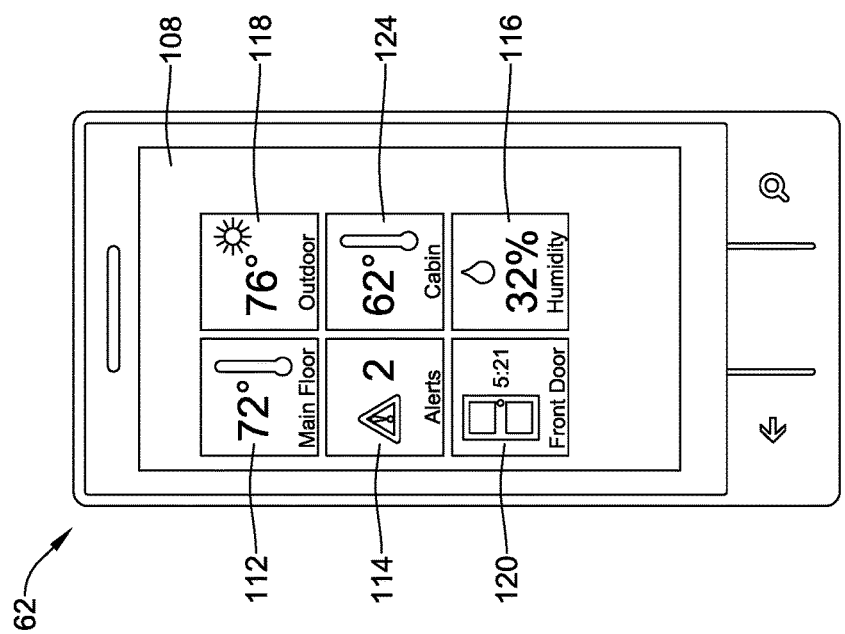

MOBILE DEVICE FOR BUILDING CONTROL WITH ADAPTIVE USER INTERFACE

TECHNICAL FIELD

The present disclosure relates generally to building control systems, and more particularly to devices, systems and methods for enhancing a user experience when interacting with building control systems from a remote location.

BACKGROUND

Building control systems are often used to control safety, security and/or comfort levels within a building or other structure. Illustrative but non-limiting examples of building control systems include Heating, Ventilation and/or Air Conditioning (HVAC) systems, security systems, lighting systems, fire suppression systems and/or the like. In some cases, it is possible to affect the operation of a building control system from a remote location using a mobile wireless device, such as a smart phone. What would be desirable is a mobile wireless device interface that is configured to enhance the user experience when interacting with a building control system.

SUMMARY

The present disclosure relates generally to building control systems, and more particularly to mobile devices that are configured to enhance the user experience when interacting with building control systems from a remote location. In one example, a wireless device is configured to communicate with and help control one or more building control components of a building control system. The example wireless device includes a wireless interface for sending and receiving information, a memory, a location service for identifying a current geo-location of the wireless device, a user interface including a display, and a controller coupled to the wireless interface, the memory, the location service, and the user interface. The controller of the wireless device may be configured to accept two or more user actions via the user interface and for each of the two or more user actions, retrieve a geolocation of the wireless device via the location service and associate the geo-location with the corresponding user action and/or retrieve a time and associate the time with the corresponding user action. The controller of the wireless device may be further configured to display building control information on the display. The building control information that is displayed may be adapted based, at least in part, on a pattern that is identified in the two or more user actions and the associated geo-locations and/or the associated times.

In some cases, a system may be provided for adapting building control information displayed on a display of a wireless device, where the wireless device may include a user interface configured to control one or more building control components of a building control system. The system may include a processor, memory in communication with the processor, and an input/output interface. The memory may be configured to store received user actions on wireless devices and associated data, along with instructions executable by the processor for controlling building control information displayed on a user's wireless device. The server may be configured to receive, via the input/output interface, two or more user actions with a user interface of a user's wireless device and geo-locations and/or times associated with those user actions. The server may be further configured to identify a pattern in the two or more user actions and associated geo-locations and/or associated times. Based, at least in part, on the identified pattern, the server may be configured to send information to the wireless device via the input/output interface that indicates to the wireless device what building control information to display on the user interface of the user's wireless device.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments in connection with the accompanying drawings, in which:

FIGS. 5-6B show illustrative screens that may be displayed on the user interface of the wireless device used to access and/or control the HVAC system of FIG. 1;

Figure 1:
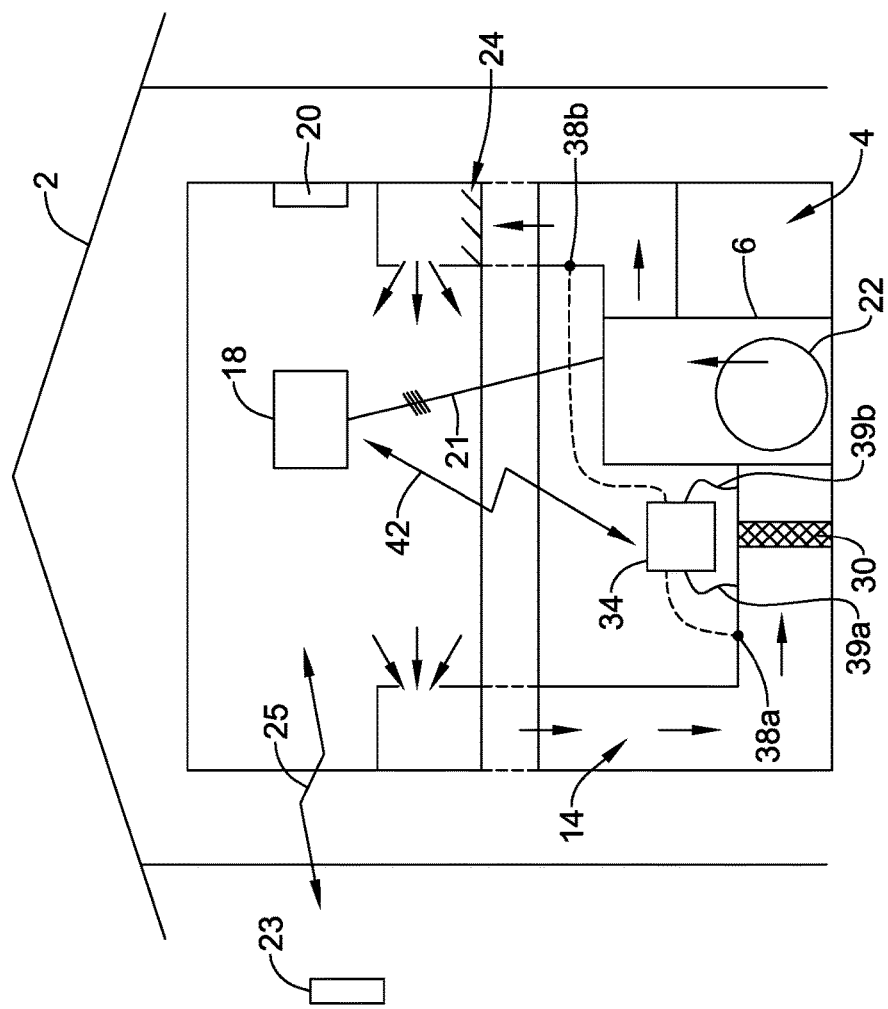
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several illustrative embodiments which are meant to be illustrative in nature.

Building control systems are often used to control safety, security and/or comfort levels within a building or other structure. Illustrative but non-limiting examples of building control systems include Heating, Ventilation and/or Air Conditioning (HVAC) systems, security systems, lighting systems, fire suppression systems and/or the like. While much of the discussion below uses an HVAC system an example building control system, it must be recognized that the present disclosure can be used in conjunction with any suitable building control system, including building control systems that include one or more of an HVAC system, a security system, a lighting system, a fire suppression system and/or the like.

FIG. 1 is a schematic view of a building 2 having a building control system (e.g., an illustrative heating, ventilation, and air conditioning (HVAC) system 4). While FIG. 1 shows a typical forced air type HVAC system, other types of HVAC systems and/or building control systems are contemplated including, but not limited to, boiler systems, radiant heating systems, electric heating systems, cooling systems, heat pump systems, and/or any other suitable type of HVAC system or building control system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 (e.g., building automation controllers) may be configured to control the comfort level in the building or structure by activating and deactivating the HVAC component(s) 6 in a controlled manner. The HVAC controller(s) 18 may be configured to control the HVAC component(s) 6 via a wired or wireless communication link 21. In some cases, the HVAC controller(s) 18 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the HVAC controller (s) 18 may be a zone controller, or may include multiple zone controllers each monitoring and/or controlling the comfort level within a particular zone in the building or other structure.

Illustrative HVAC controllers, which are not meant to be limiting in any way, are disclosed in: US Published Patent Application No. 20090140062, entitled "HVAC CONTROLLER THAT SELECTIVELY REPLACES OPERATING INFORMATION ON A DISPLAY WITH SYSTEM STATUS INFORMATION"; US Published Application No. 20090143880, entitled "HVAC CONTROLLER WITH CONTEXT SENSITIVE HELP SCREENS"; US Published Application No. 20090143918, entitled "METHOD AND APPARATUS FOR CONFIGURING AN HVAC CONTROLLER"; US Published Application No. 20090143916, entitled "HVAC CONTROLLER HAVING A PARAMETER ADJUSTMENT ELEMENT WITH A QUALITATIVE INDICATOR"; US Published Application No. 20090143879, entitled "HVAC CONTROLLER WITH PARAMETER CLUSTERING"; US Published Application No. 20090140056, entitled "HVAC CONTROLLER WITH QUICK SELECT FEATURE,"; and Patent Cooperation Treaty Application PCT/US/14/69408, filed on Dec. 9, 2014 and entitled "BUILDING AUTOMATION CONTROL SYSTEMS", the entireties of which are incorporated herein by reference for all purposes.

In some cases, the HVAC system 4 may include an internet gateway or other device 20 that may permit the HVAC controller 18, as described herein, to communicate over a wired or wireless network 25 with a remote device 23. In some cases, the network 25 may be a wireless local area network (WLAN) or a wide area network (WAN) such as, for example, the Internet. In some cases, the network 25 may include a cellular network. The remote device 23 may be used to communicate with and/or control the HVAC controller(s) 18 from a remote location, sometimes outside of and away from the building 2. The remote device 23 may be any one of a mobile phone including a smart phone, a PDA, a tablet computer, a laptop or personal computer, an e-Reader, and/or any other suitable wired or wireless device, as desired.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14.

In some cases, the system of vents or ductwork 10 and/or 14 can include one or more dampers 24 to regulate the flow of air, but this is not required. For example, one or more dampers 24 may be coupled to one or more HVAC controller (s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component (s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may be configured to measure or detect a change in a given parameter between the return air side and the discharge air side of the HVAC system 4. For example, the equipment interface module 34 may be adapted to measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating mode may be calculated by subtracting the return air temperature from the discharge air temperature (e.g. delta T=discharge air temp.-return air temp.). For the cooling mode, the delta T may be calculated by subtracting the discharge air temperature from the return air temperature (e.g. delta T=return air temp.-discharge air temp.).

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In either cases, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
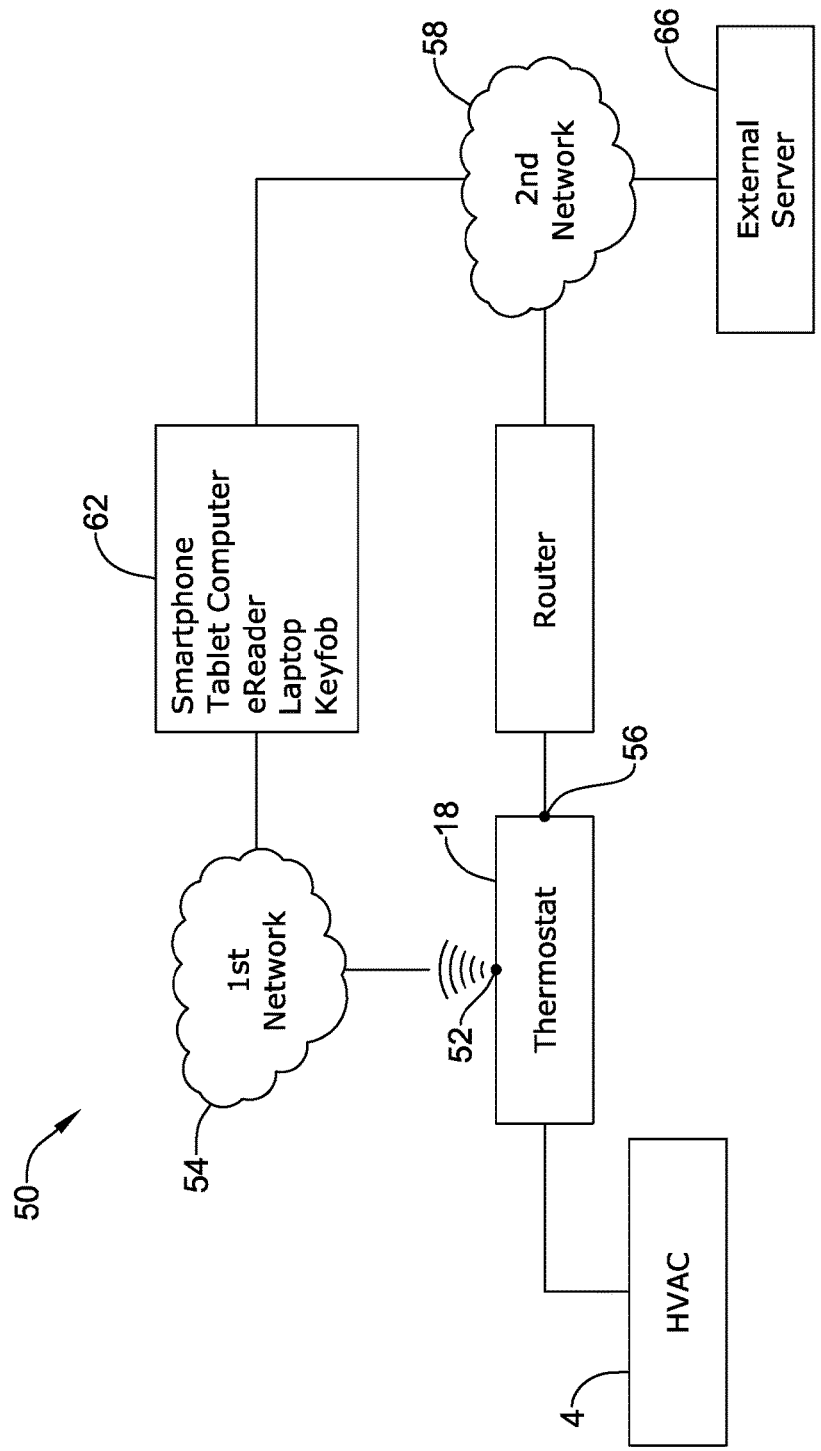
FIG. 2 is a schematic view of an illustrative building control system that may facilitate access and/or control to the HVAC system of FIG. 1.

FIG. 2 is a schematic view of an illustrative building control system 50 that may facilitate remote access and/or control of the HVAC system 4 shown in FIG. 1. The illustrative building control system 50 includes an HVAC controller, such as for example, HVAC controller 18 (see FIG. 1) that is configured to communicate with and control one or more HVAC components 6 of the HVAC system 4 (see FIG. 1). As discussed above, the HVAC controller 18 may communicate with the one or more components 6 of the HVAC system 4 via a wired or wireless link. Additionally, the HVAC controller 18 may be configured to communicate over one or more wired or wireless networks that may accommodate remote access and/or control of the HVAC controller 18 via remote device including, but not limited to, mobile phones including smart phones, PDAs, tablet computers, laptop or personal computers, e-Readers, and/or the like.

In the example shown in FIG. 2, the HVAC controller 18 may include a first communications port 52 for communicating over a first network 54, and in some cases, a second communications port 56 for communicating over a second network 58. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. Additionally, in some cases, the wireless local area network 54 may be an ad-hoc wireless network, but this is not required.

Depending upon the application and/or where the user is located, remote access and/or control of the HVAC controller 18 may be provided over the first network 54 and/or the second network 58. A variety of mobile wireless devices 62 (e.g., one or more mobile wireless devices 62) may be used to access and/or control the HVAC controller 18 from a remote location (e.g. remote from HVAC Controller 18) over the first network 54 and/or second network 58 including, but not limited to, mobile phones including smart phones, PDAs, tablet computers, laptop or personal computers, e-Readers, and/or the like. In many cases, the mobile wireless devices 62 may be configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, the HVAC controller 18 may be programmed to communicate over the second network 58 with an external web service hosted by one or more external web servers 66. A non-limiting example of such an external web service is Honeywell's TOTAL CONNECT™ web service, available from Honeywell International, Inc. In this example, the HVAC controller 18 may be configured to upload selected data via the second network 58 to the external web service where it may be collected and stored on the external web server 66. In some cases, the data may be indicative of the performance, current operating mode, current sensed temperature, current setpoint, and/or other information related to the operation of the HVAC system 4. Additionally, the HVAC controller 18 may be configured to receive and/or download selected data, settings and/or services including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like. In some instances, the HVAC controller 18 may be configured to receive one or more user profiles having at least one operational parameter setting that is selected by and reflective of a user's preferences. Additionally, the HVAC controller 18 may be configured to receive local weather data, weather alerts and/or warnings, major stock index ticker data, and/or news headlines over the second network 58. These are just some examples.

Figure 3:
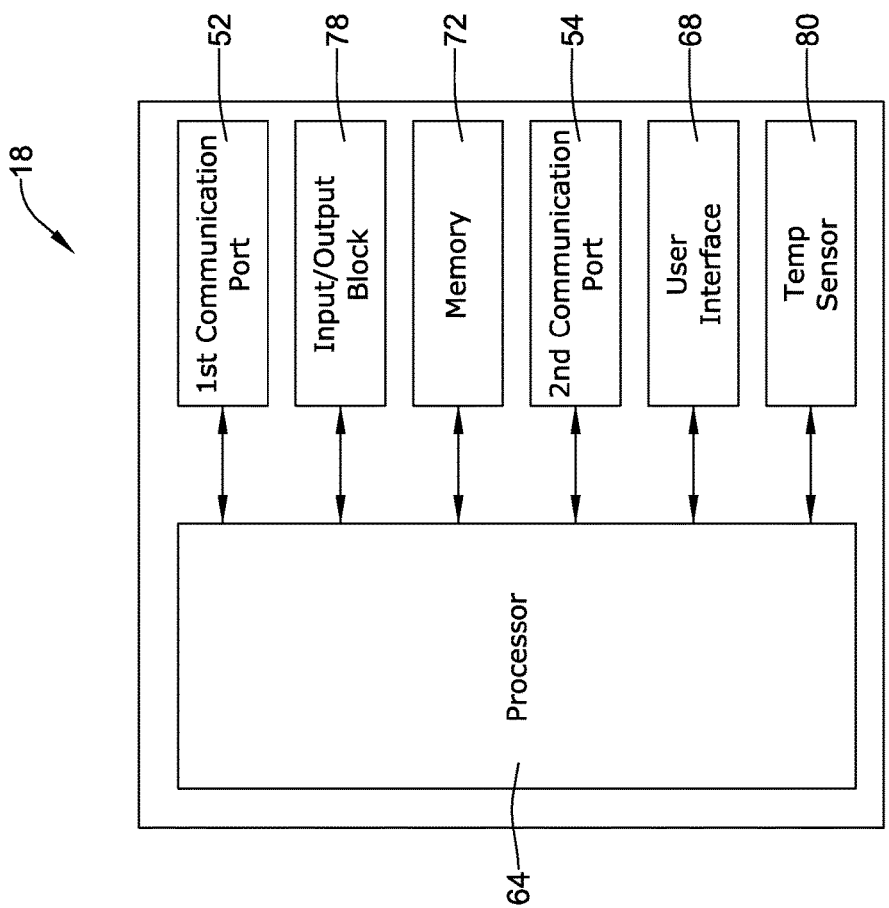
FIG. 3 is a schematic block diagram of an illustrative HVAC controller.

FIG. 3 is a schematic view of an illustrative HVAC controller 18 (i.e. building controller) that may be accessed and/or controlled from a remote location over the first network 54 and/or the second network 58 (FIG. 2) using a mobile wireless device 62 such as, for example, a smart phone, a PDA, a tablet computer, a laptop or personal computer, an e-Reader, and/or the like. In some instances, the HVAC controller 18 may be a thermostat, but this is not required. In the example shown in FIGS. 2 and 3, the HVAC controller 18 may include a first communications port 52 for communicating over a first network (e.g. wireless LAN) and a second communications port 56 for communicating over a second network (e.g. WAN or the Internet). The first communications port 52 can be a wireless communications port including a wireless transceiver for wirelessly sending and/or receiving signals over a first wireless network 54. Similarly, the second communications port 56 may be a wireless communications port including a wireless transceiver for sending and/or receiving signals over a second wireless network 58. In some cases, the second communications port 56 may be in communication with a wired or wireless router or gateway for connecting to the second network, but this is not required. In some cases, the router or gateway may be integral to the HVAC controller 18 or may be provided as a separate device. Additionally, the illustrative HVAC controller 18 may include a processor (e.g. microprocessor, microcontroller, etc.) 64 and a memory 72. The HVAC controller 18 may also include a user interface 68, but this is not required.

In some cases, HVAC controller 18 may include a timer (not shown). The timer may be integral to the processor 64 or may be provided as a separate component. The HVAC controller 18 may also optionally include an input/output block (I/O block) 78 for receiving one or more signals from the HVAC system 4 and/or for providing one or more control signals to the HVAC system 4. For example, the I/O block 78 may communicate with one or more HVAC components 6 of the HVAC system 4. Alternatively, or in addition to, the I/O block 78 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device.

The HVAC controller 18 may also include an internal temperature sensor 80, but this is not required. In some cases, the HVAC controller 18 may communicate with one or more remote temperature sensors, humidity sensors, and/or occupancy sensors located throughout the building or structure. The HVAC controller 18 may communicate with a temperature sensor and/or humidity sensor located outside of the building or structure for sensing an outdoor temperature and/or humidity if desired.

The processor 64 may operate in accordance with an algorithm that controls or at least partially controls one or more HVAC components of an HVAC system such as, for example, HVAC system 4 shown in FIG. 1. The processor 64, for example, may operate in accordance with a control algorithm that provides temperature set point changes, humidity set point changes, schedule changes, start and end time changes, window frost protection setting changes, operating mode changes, and/or the like. At least a portion of the control algorithm may be stored locally in the memory 72 of the HVAC controller 18 and, in some cases, may be received from an external web service over the second network. The control algorithm (or portion thereof) stored locally in the memory 72 of the HVAC controller 18 may be periodically updated in accordance with a predetermined schedule (e.g. once every 24 hours, 48 hours, 72 hours, weekly, monthly, etc.), updated in response to any changes to the control algorithm made by a user, and/or updated in response to a user's request. The updates to the control algorithm or portion of the control algorithm stored in the memory 72 may be received from an external web service over the second network 58. In some cases, the control algorithm may include settings such as set points.

In some cases, the processor 64 may operate according to a first operating mode having a first temperature set point, a second operating mode having a second temperature set point, a third operating mode having a third temperature set point, and/or the like. In some cases, the first operating mode may correspond to an occupied mode and the second operating mode may correspond to an unoccupied mode. In some cases, the third operating mode may correspond to a holiday or vacation mode wherein the building or structure in which the HVAC system 4 is located may be unoccupied for an extended period of time. In other cases, the third operating mode may correspond to a sleep mode wherein the building occupants are either asleep or inactive for a period of time. These are just some examples. It will be understood that the processor 64 may be capable of operating in additional modes as necessary or desired. The number of operating modes and the operating parameter settings associated with each of the operating modes may be established locally through a user interface, and/or through an external web service and delivered to the HVAC controller via the second network 58 where they may be stored in the memory 72 for reference by the processor 64.

In some cases, the processor 64 may operate according to one or more predetermined operating parameter settings associated with a user profile for an individual user. The user profile may be stored in the memory 72 of the HVAC controller 18 and/or may be hosted by an external web service and stored on an external web server, such as external web server 66. The user profile may include one or more user-selected settings for one or more operating modes that may be designated by the user. For example, the processor 64 may operate according to a first operating mode having a first temperature set point associated with a first user profile, a second operating mode having a second temperature set point associated with the first user profile, a third operating mode having a third temperature set point associated with the first user profile, and/or the like. In some cases, the first operating mode may correspond to an occupied mode, the second operating mode may correspond to an unoccupied mode, and the third operating mode may correspond to a vacation or extended away mode wherein the building or structure in which the HVAC system 4 is located may be unoccupied for an extended period of time. In some cases, multiple user profiles may be associated with the HVAC controller 18. In certain cases where two or more user profiles are associated with the HVAC controller 18, the processor 64 may be programmed to include a set of rules for determining which individual user profile takes precedence for controlling the HVAC system when both user profiles are active.

In the illustrative embodiment of FIG. 3, the user interface 68, when provided, may be any suitable user interface that permits the HVAC controller 18 to display and/or solicit information, as well as accept one or more user interactions with the HVAC controller 18. For example, the user interface 68 may permit a user to locally enter data such as temperature set points, humidity set points, starting times, ending times, schedule times, diagnostic limits, responses to alerts, and the like. In one embodiment, the user interface 68 may be a physical user interface that is accessible at the HVAC controller 18, and may include a display and/or a distinct keypad. The display may be any suitable display. In some instances, a display may include or may be a liquid crystal display (LCD), and in some cases a fixed segment display or a dot matrix LCD display. In other cases, the user interface 68 may be a touch screen LCD panel that functions as both display and keypad. The touch screen LCD panel may be adapted to solicit values for a number of operating parameters and/or to receive such values, but this is not required. In still other cases, the user interface 68 may be a dynamic graphical user interface.

In some instances, the user interface 68 need not be physically accessible to a user at the HVAC controller 18. Instead, the user interface 68 may be a virtual user interface 68 that is accessible via the first network 54 and/or second network 58 using a mobile wireless device such as one of those mobile wireless devices 62 previously described herein. In some cases, the virtual user interface 68 may include one or more web pages or data (e.g., data for an application program code) that are broadcasted over the first network 54 (e.g. LAN) by an internal web server implemented by the processor 64. When so provided, the virtual user interface 68 may be accessed over the first network 54 using a mobile wireless device 62 such as any one of those listed above. Through the one or more web pages or application program codes populated by the data, the processor 64 may be configured to display information relevant to the current operating status of the HVAC system 4 including the current operating mode, temperature set point, actual temperature within the building, outside temperature, outside humidity and/or the like. Additionally, the processor 64 may be configured to receive and accept any user inputs entered via the virtual user interface 68 including temperature set points, humidity set points, starting times, ending times, schedule times, window frost protection settings, diagnostic limits, responses to alerts, and the like.

In other cases, the virtual user interface 68 may include one or more web pages or data (e.g., data for populating application program codes) that are broadcasted over the second network 58 (e.g. WAN or the Internet) by an external web server (e.g. web server 66). The one or more web pages or mobile applications (e.g., as populated by the data) forming the virtual user interface 68 may be hosted by an external web service and associated with a user account having one or more user profiles. The external web server 66 may receive and accept any user inputs entered via the virtual user interface and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server may update the control algorithm, as applicable, and transmit at least a portion of the updated control algorithm over the second network 58 to the HVAC controller 18 where it is received via the second port 56 and may be stored in the memory 72 for execution by the processor 64.

The memory 72 of the illustrative HVAC controller 18 may be in communication with the processor 64. The memory 72 may be used to store any desired information, such as the aforementioned control algorithm, set points, schedule times, diagnostic limits such as, for example, differential pressure limits, delta T limits, and the like. The memory 72 may be any suitable type of storage device including, but not limited to, RAM, ROM, EPROM, flash memory, a hard drive, and/or the like. In some cases, the processor 64 may store information within the memory 72, and may subsequently retrieve the stored information from the memory 72.

Referring back generally to FIG. 2, any number of wired or wireless devices, including the HVAC controller 18 and a user's mobile wireless device 62, may be connected to and enrolled in a building's wireless local area network 54. In some cases, the HVAC controller 18 may be configured to execute a program code stored in the memory 72 for connecting to and enrolling with the wireless local area network 54 of the building in which it is located. Each device may be assigned a unique identifier (e.g. IP address) upon enrollment with the wireless local area network. The unique identifier may be assigned by a router or other gateway device. The router or gateway device may store a local cache containing a list of unique identifiers (e.g. IP addresses) for each of the devices connected to the wireless local area network. The router or gateway can be a separate device from the HVAC controller 18, but this is not required. In some cases, a MAC address or MAC CRC address provided by the device being enrolled in the wireless local area network host upon connection of the device to the network may be used to uniquely identify the device on the wireless local area network 54 and/or wireless network 58. The unique identifier may be used to identify and recognize each device on the network 54 each time the device is connected to the wireless local area network 54 and/or wireless network 58.

Figure 4:
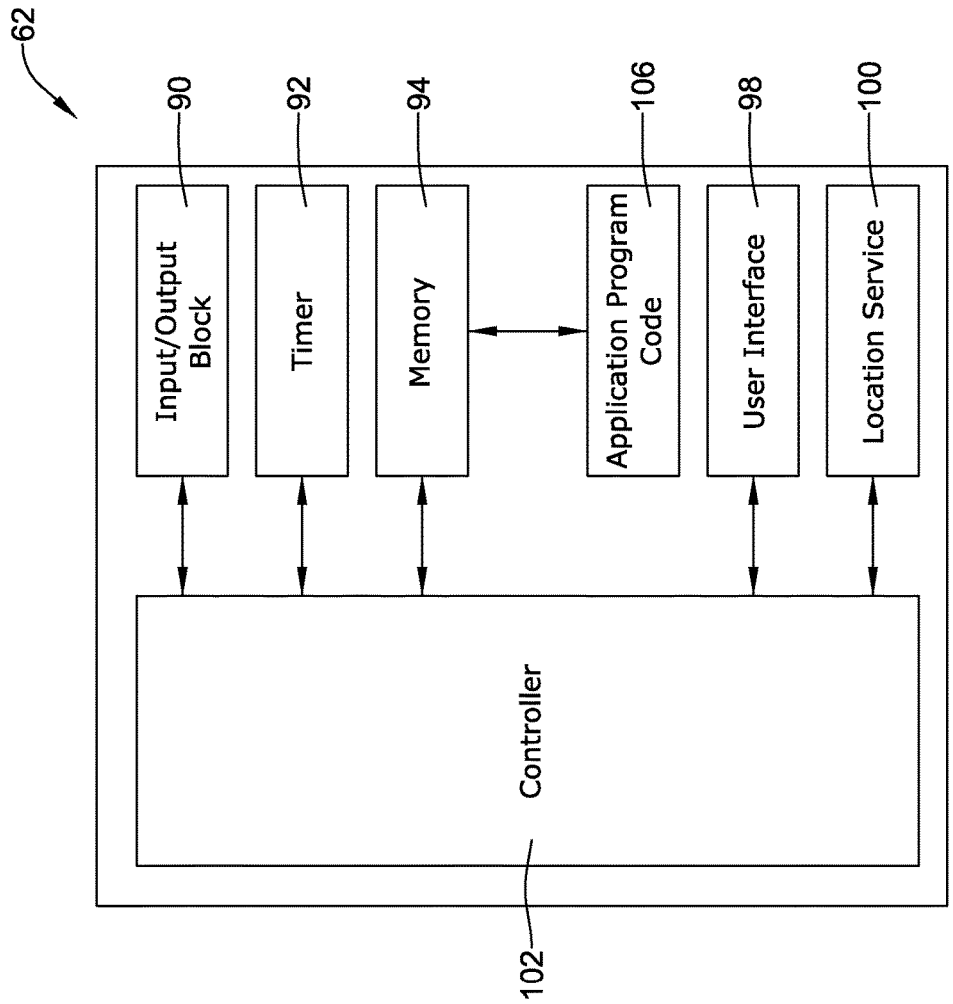
FIG. 4 is a schematic block diagram of an illustrative wireless device that may be used to communicate with and/or control the illustrative HVAC controller of FIG. 3.

FIG. 4 is a schematic block diagram of a mobile wireless device 62 that may be used to communicate with and control one or more HVAC controllers 18 located within a building or structure 2. The mobile wireless device 62 may be, for example, any one of the devices described herein. In some instances, the mobile wireless device 62 may be a smartphone or a tablet computer, but this is not required. As discussed above with reference to FIG. 2, the mobile wireless device 62 may be used to communicate with and/or control one or more HVAC controllers 18 located within the building or structure 2 via the first network 54 and/or second network 58 depending upon the application. In some cases, as described herein, the mobile wireless device 62 may be programmed to communicate over the second network 58 with an external web service hosted by one or more external web servers 66 to which the one or more HVAC controllers 18 is also connected. A non-limiting example of such an external web service is Honeywell's TOTAL CONNECT™ web service. Communication and data may be transmitted between the mobile wireless device 62 and the one or more HVAC controllers 18 via the external web service.

As shown in FIG. 4, the mobile wireless device 62 may include at least one wireless input/output port 90 (e.g., a wireless interface) for wirelessly sending and/or receiving data (e.g., information) over the first and/or second network 54, 58 to and from one or more external web servers 66 and/or one or more HVAC controllers 18 located within the building 2. In some cases, the mobile wireless device 62 may include a timer 92 for identifying a current time and/or a location service 100 for identifying a current geo-location of the mobile wireless device 62. Additionally, the mobile wireless device 62 may include a memory 94, a user interface 98 including a display, and a controller 102 (e.g. microprocessor, microcontroller, etc.) coupled to and/or in communication with the input/output port 90, the memory 94, the user interface 98, and/or the location service 100. In some instances, one or more application program codes 106 (sometimes referred to as apps or mobile applications) may be stored in the memory 94 for execution by the controller 102 of the mobile wireless device 62. The one or more application program codes 106 may be obtained (e.g., purchased and/or downloaded) from an external web service such as, for example, Apple, Inc.'s ITUNES™, Google Inc.'s Google Play, Honeywell's TOTAL CONNECT™ web service, a contractor's web site, and/or any other suitable location. In one instance, at least one of the application program codes 106 stored in the memory 94 may relate to controlling an HVAC system 4 (and/or other building control system as desired).

When so provided, the timer 92 may be any type of timer. Illustratively, the timer 92 may be used by the controller 102 to time stamp a user interaction with a mobile wireless device 62 to save the time stamp in memory 94 or other memory. The user interaction may be any user interaction with the mobile wireless device, such as the launch of a particular application program code 106, an interaction with a particular feature or setting of an application program code 106, the closing of a particular application program code 106, or other interaction. The time stamp may be any suitable time stamp. In some cases, the time stamp may be include a discrete time and/or an elapsed time (e.g., an amount of time a user spends on an action or activity)) of the user interaction with the mobile wireless device 62. In one example, the controller 102 may be configured to store a time at which a user initiated an interaction with a particular feature or setting of an application program code 106, along with an amount of time spent interacting with the particular feature or setting of an application program code 106.

In some cases, the location service 100 may include a location detector that uses one or more of cellular triangulation (CT), Global Position System (GPS), WiFi Based Positioning (WPS), and/or any other suitable location service for detecting a current geographical position or location of the mobile wireless device 62. In some cases, the controller 102 may use the location service 100 to identify a geo-location of the mobile wireless device 62 during the user interaction, and location stamp the user interaction and save the location stamp to the memory 94 or other memory. The user interaction may be any user interaction with the mobile wireless device, such as the launch of a particular application program code 106, an interaction with a particular feature or setting of an application program code 106, the closing of a particular application program code 106, and/or any other suitable user interaction. The location stamp may be any suitable location stamp. In some cases, the location stamp may be include a static geo-location (e.g. GPS coordinates, street address, etc.) and/or a dynamic location (e.g., if a user is moving, how fast the user is moving, a direction of movement such as up, down, east, west, north, and/or south) of the mobile wireless device 62 during the user interaction.

The controller 102 be configured to use the location stamp and/or time stamp to determine and/or organize information that is presented to the user via the user interface 98 of the mobile wireless device 62. In some cases, the controller 102 may determine and/or organize information based on a history of user actions with the user interface 98 and location stamps and/or time stamps associated with those user actions. Additionally, what is displayed on the user interface 98 and how the display is organized may be updated over time as more user actions and associated location stamps and/or time stamps are received. This is believed to significantly enhance the user experience of the mobile wireless device 62 by presenting more relevant information/options to the user at a given location and/or time.

In one example, a user action may be a user modifying a set point of one or more HVAC components 6 of HVAC system 4 through an HVAC system control application program code 106 running on the mobile wireless device 62. In another example, a user action may be a user checking a current temperature at a building with the HVAC system 4 through the HVAC system control application program code 106 running on the mobile wireless device 62. In another example, a user action may be a user opening a camera view of the building with the HVAC system 4 through the HVAC system control application program code 106 or another control application code (e.g. a security system application program) running on the mobile wireless device 62. In yet another example, a user action may include a user not taking any interaction with the mobile wireless device 62. These are just some examples.

Figure 5:
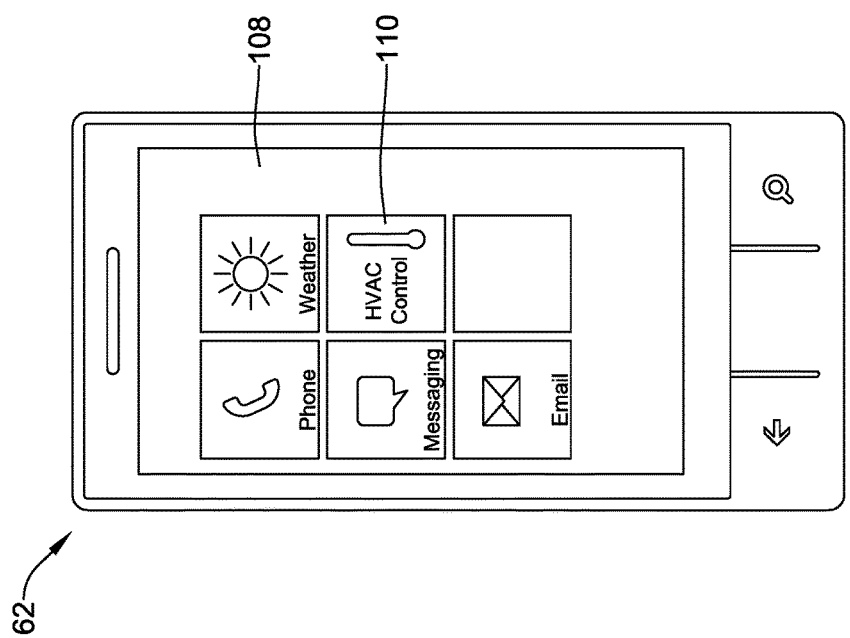
Figure 6B:
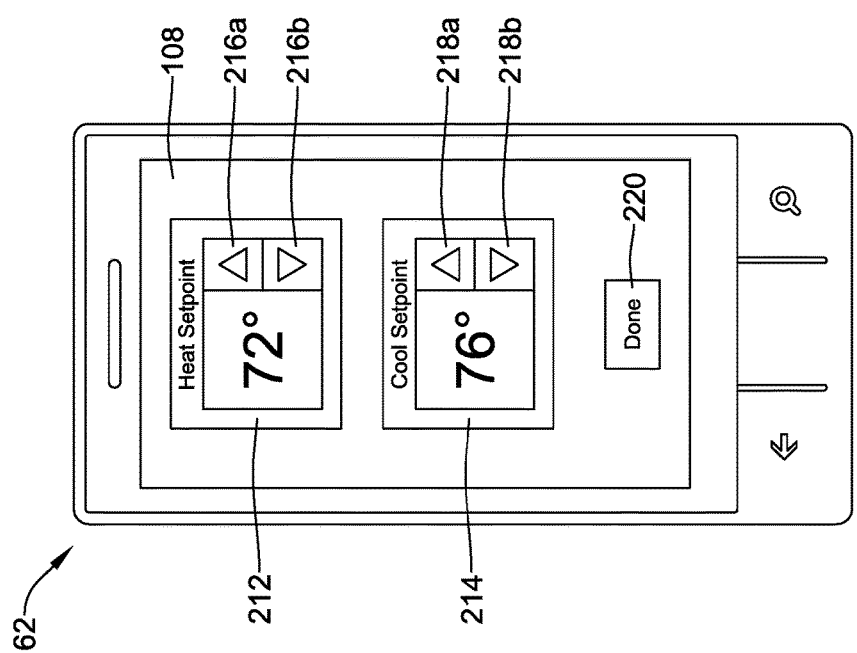

FIGS. 5-6B provide illustrative screens that may be displayed on the user interface 98 of an illustrative mobile wireless device 62. As shown in FIG. 5 at least one application program code 106 stored in the memory 94 of the mobile wireless device 62 may cause the controller 102 to display at least one icon 110 related to controlling an HVAC system 4 on the display 108 of the mobile wireless device 62. The icon 110, when selected by a user, may cause the controller 102 to execute an application program code 106 for communicating with and/or controlling one or more components 6 of an HVAC system 4 located within a building.

Upon selection of the icon 110, and as shown in FIG. 6A, the application program code 106 may cause the controller 102 to display additional icons 112, 114, 116, 118, 120, and/or 124 on the display 108, each icon 112, 114, 116, 118, 120, and 124 related to a unique function that, when selected, aids a user in controlling one or more HVAC components 6 of the HVAC system 4. In some cases, the unique function of at least some of the icons 112, 114, 116, 118, 120, and 124 may include displaying information received from the HVAC system 4 via the input/output port 90 and/or sending one or more commands to control the HVAC system 4 via the input/output port 90. In one example, and as shown in FIG. 6A, a first icon 112 may display current indoor temperature information for one or more locations inside the building 2, a second icon 114 may display one or more alerts related to the operation of the HVAC system 4, a third icon 116 may display current humidity information, and a fourth icon 118 may display the current outdoor air temperature. In some cases, the control and operation of a building's HVAC system 4 may be integrated with the control and operation of a building's security system. In this example, the application program code 106 may also cause the controller 102 to display additional information regarding the status of features of the building's security system. For example, as shown in the example provided in FIG. 6A, the application program code 106 may cause the controller 102 to display a fifth icon 120 relating to a door status of the building 2. These are just some examples.

In some cases, the application program code 106 may facilitate control of one or more HVAC components 6 of an HVAC system 4 located in at least one additional building that is maintained by the user such as, for example, a rental property, an office, a cabin, and/or a vacation home, but not limited to these. When so provided, the application program code 106 may cause the controller 102 to display at least one additional icon 124 related to the HVAC system 4 and/or security system located within the additional building or structure. For example, as shown in FIG. 6A, the application program code 106 may cause the controller 102 to display an additional icon 124 that may display the current indoor air temperature of the user's cabin. It should be understood that additional icons relating to similar and/or different functions for displaying information from and/or controlling one or more HVAC components 6 of an HVAC system located within one or more buildings associated with the user may be displayed on the display 108 of the user's mobile wireless device 62 and that depending on the features of the user's HVAC system(s) 4, and the access rights of various users, the number and function associated with each of the icons may differ for each individual user.

In cases where two or more icons 112, 114, 116, 118, 120, 124, and/or other icons are displayed on the display 108 of the mobile wireless device 62, the controller 102 may be configured to dynamically order the two or more icons 112, 114, 116, 118, 120, and/or 124 on the display 108 according to a dynamic ranking algorithm. An illustrative example of dynamically ordering two or more icons is disclosed in further detail in U.S. application Ser. No. 14/359,440, filed on Nov. 30, 2012 and entitled REMOTE APPLICATION FOR CONTROLLING AN HVAC SYSTEM, which is hereby incorporated by reference for all purposes.

In some cases, the dynamic ranking algorithm may be stored in the memory 94 of the mobile wireless device 62 and, in some cases, may be integrated into the application program code 106 that causes the controller 102 to display one or more icons (e.g. icons 112, 114, 116, 118, 120, and/or 124) relating to controlling the HVAC system 4, as described herein. In other cases, the dynamic ranking algorithm may form at least a portion of an additional program code stored in the memory 94 of the wireless device, but this is not required. The dynamic ranking algorithm may cause the controller 102 to learn how the user interacts with the icons 112, 114, 116, 118, 120 and/or 124 on the display 108, and may cause the controller 102 to arrange and display the one or more icons 112, 114, 116, 118, 120, and/or 124 on the display 108 based, at least in part, on the user's interactions with the one or more icons 112, 114, 116, 118, 120, and/or 124. For example, as shown in FIG. 6A, where there are two or more icons 112, 114, 116, 118, 120, and/or 124, the controller 102 may be configured to display the two or more icons 112, 114, 116, 118, 120, and/or 124 in a grid pattern on the display 108, wherein icons 112, 114, 116, 118, 120, and/or 124 with a higher rank are displayed at a higher location in the grid pattern and icons 112, 114, 116, 118, 120, and/or 124 having a lower rank are displayed at a lower location in the grid pattern. The dynamic ranking algorithm may be based on one or more factors including, but not limited to: a relative frequency of selection of each of two or more icons by a user; a current time of day, where the controller 102 may maintain the current time of day; a current geographical location of the mobile wireless device 62; a current time of the year, where the controller 102 may maintain a current time of the year; a current temperature, where the controller 102 may receive a current temperature via the input/output port 90; a measure related to a temperature history stored in the memory of the mobile wireless device 62; a current humidity, where the controller 102 may receive a current humidity via the input/output port 90, a current operating mode of the HVAC system (e.g. heat, cool mode); what HVAC equipment is currently active (e.g. furnace, compressor, humidifier); a current location of the mobile wireless device 62 relative to the HVAC system 4 where the mobile wireless device 62 may include a location detector that dynamically provides and updates a current location of the mobile wireless device 62; and/or any other suitable factor as desired. These are just some examples. In many cases, the user may "drag and drop" one or more of the icons 112, 114, 116, 118, 120, and/or 124 displayed on the display 108 to a desired location on the display 108. In some cases, the user may "hide" one or more icons 112, 114, 116, 118, 120, and/or 124 from view on the display 108 of the mobile wireless device 62.

In some cases, selection of certain icons such as, for example, icon 112 related to an indoor temperature for one or more locations within the building 2 may cause the controller 102 to display additional icons relating to the unique function of the selected icon 112. For example, as shown in FIG. 6B, selection of icon 112 may cause the controller 102 to display icons 212, 214 on the display 108 for adjusting a heating temperature setpoint and a cooling temperature setpoint, respectively. In some cases, each icon 212 and 214 may include first and second arrows 216a, 216b and 218a, 218b for adjusting the temperature setpoint for both heating and cooling. In some cases, the controller 102 may be configured to arrange and/or display the icons 212, 214 on the display 108 according to a dynamic ranking algorithm, as described herein. In other cases, the controller 102 may be configured to arrange and/or display the icons 212, 214 based upon which mode (e.g. heating or cooling) is currently operating. For example, if the cooling mode is currently operating, the controller 102 may display icon 214 for adjusting the cooling setpoint in a top portion of the display 108 and/or may display icon 214 more prominently relative to icon 212 for adjusting the heating setpoint. In addition or in alternative to, the controller 102 may highlight, enlarge, or otherwise visually enhance icon 214 relative to icon 212 on the display 108 of the device. Similarly, if the heating mode is currently operating, the controller 102 may be configured to display icon 212 in a top portion of the display 108 and/or may display icon 212 more prominently relative to the icon 214 for adjusting the cooling setpoint. In some instances, if one mode is operating (e.g. heating) and the other mode (e.g. cooling) is dormant, the controller 102 may be configured to only display icon (e.g. icon 212) for adjusting the appropriate setpoint. Selection of icon 220 labeled "Done" or "OK" may cause the controller 102 to display the previous screen as shown in FIG. 6A.

Figure 7:
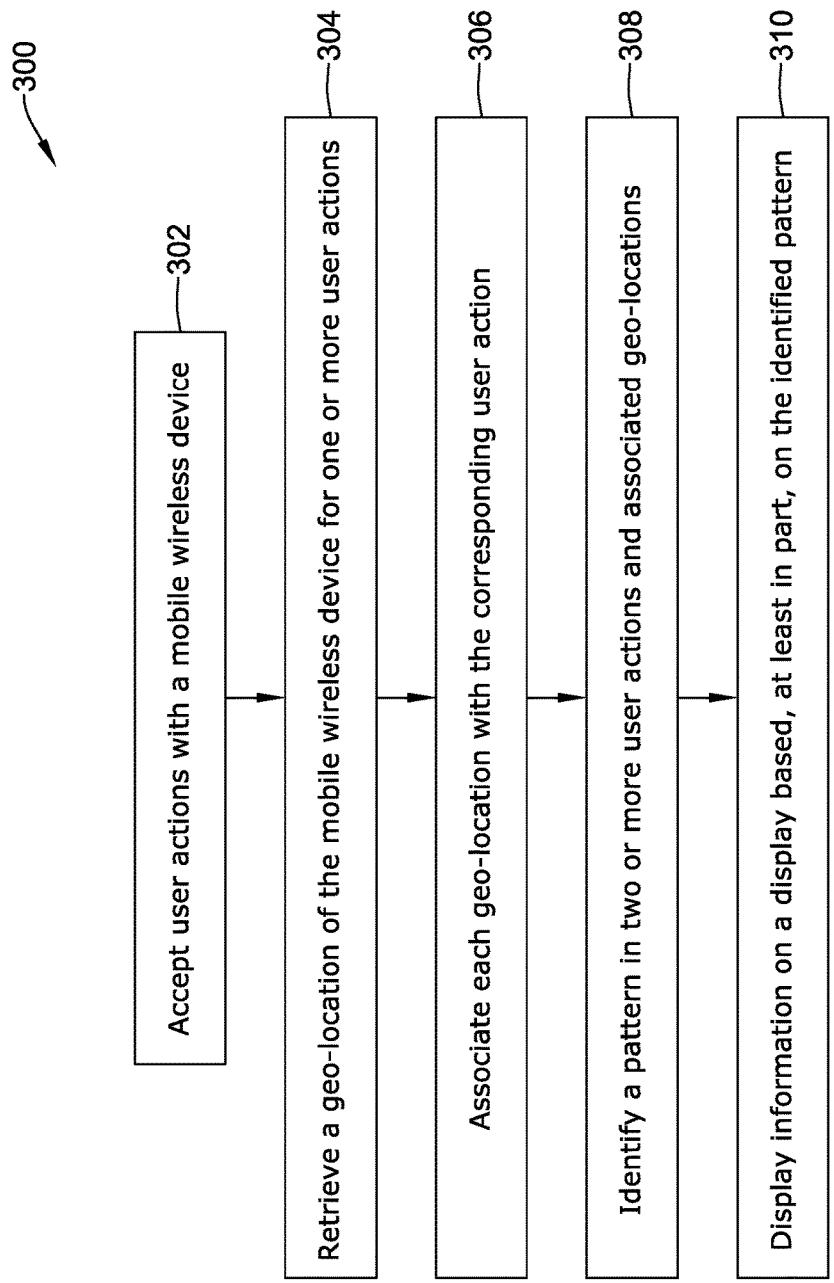
FIG. 7 is a schematic flow diagram of an illustrative method for determining information to be displayed on the user interface of the wireless device used to access and/or control the HVAC system of FIG. 1.

In addition to, as an alternative to, or as part of arranging icons in a particular pattern according to a ranking algorithm, the controller 102 may be configured to display data and/or other information from one or more building control components (e.g., HVAC controllers) of a building control system based on user interaction with an application program code 106 via the user interface 98 of the mobile wireless device 62 and/or other interactions with the mobile wireless device 62. In some cases, as shown in the diagram 300 of FIG. 7, at box 302 the controller 102 may be configured to accept one or more user actions with the application program code 106 via the user interface 98 and for each of the user actions, at box 304 the controller 102 may retrieve a geo-location of the mobile wireless device 62 via the location service 100. The controller 102 may, at box 306, associate the geo-location with the corresponding user action and, in some cases, save the geo-location associated with the user action in the memory 94 of the mobile wireless device 62 or other memory. Illustratively, the controller 102 may identify a pattern in user actions and associated geo-locations at box 308, and at box 310 the controller 102 may display building control information or other information on the display that may be adapted based, at least in part, on the pattern identified in the user actions and associated geo-locations. The identified pattern may be saved in memory 94 and, optionally, updated over time as additional user actions and associated geo-locations are received. In some examples, the identified patterns may be identified from repeated (or statistically distinguishing) user actions or non-actions at or near a particular geo-location.

Figure 8:
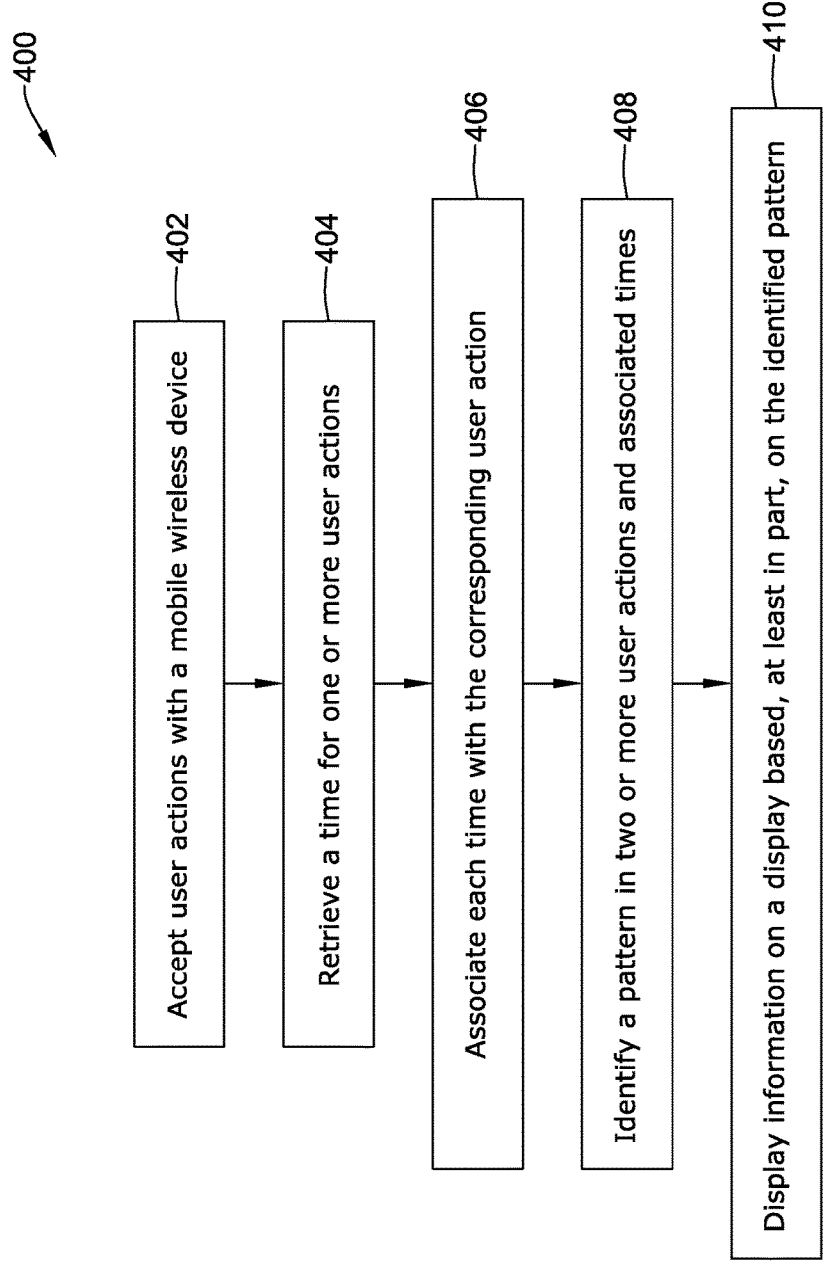
FIG. 8 is a schematic flow diagram of an illustrative method for determining information to be displayed on the user interface of the wireless device used to access and/or control the HVAC system of FIG. 1.

Additionally, or alternatively, to associate geo-locations with user actions, as shown in the diagram 400 of FIG. 8, the controller 102 may be configured to accept one or more user actions with the application program code 106 via the user interface 98 at box 402, and for each user action, retrieve a time from the timer 92, as shown at box 404. The controller 102 may, as illustrated at box 406, associate the time with the corresponding user action and, in some cases, save the time associated with the user action in the memory 94 of the mobile wireless device 62 or other memory. Illustratively, the controller 102 may identify a pattern in user actions and times at box 408, and at box 410, may display building control information or other information on the display that may be adapted based at least in part on a pattern identified in the user actions and associated times. The identified user pattern may be saved in memory 94 and, optionally, updated over time as additional user actions and associated times are received. In some examples, the identified patterns may be identified from repeated (or statistically distinguishing) user actions or non-actions at or near a particular time.

In some instances, the controller may associate a time and a geo-location with one or more (e.g., each) of the user actions and display building control information that may be adapted based, at least in part, on a pattern that is identified in the user actions and the associated geo-locations and/or the associated times. Additionally, or alternatively, the controller may associated other conditions with one or more (e.g., each) of the user actions and display building control information that may be adapted based, at least in part, on a pattern that is identified in the user actions and the associated geo-locations, associated times, and/or other associated conditions. Other associated conditions may include, but are not limited to, conditions related to devices connected to the mobile wireless device at the time of or during a user action, user actions occurring before and/or after a subject user action, and so on.

Although the diagrams 300 and 400 are described above with the controller 102 of the mobile wireless device 62 being configured to perform particular steps, other controllers or processors may be configured to perform one or more steps. In some cases, the controller 102 of the mobile wireless device 62 may be configured to transmit user actions, geo-locations associated with the user actions, and/or times associate with user actions via the wireless interface (e.g., I/O port 90) to one or more other input/output interfaces and/or other controllers. In one example, the controller 102 of the mobile wireless device 62 may transmit or output one or more (e.g., each) of the accepted user actions along with geo-locations and/or times associated with the accepted user actions to a remote server, such as remote server 66, and the remote server 66 may receive the user actions and associated geo-locations and/or times.

Figure 9:
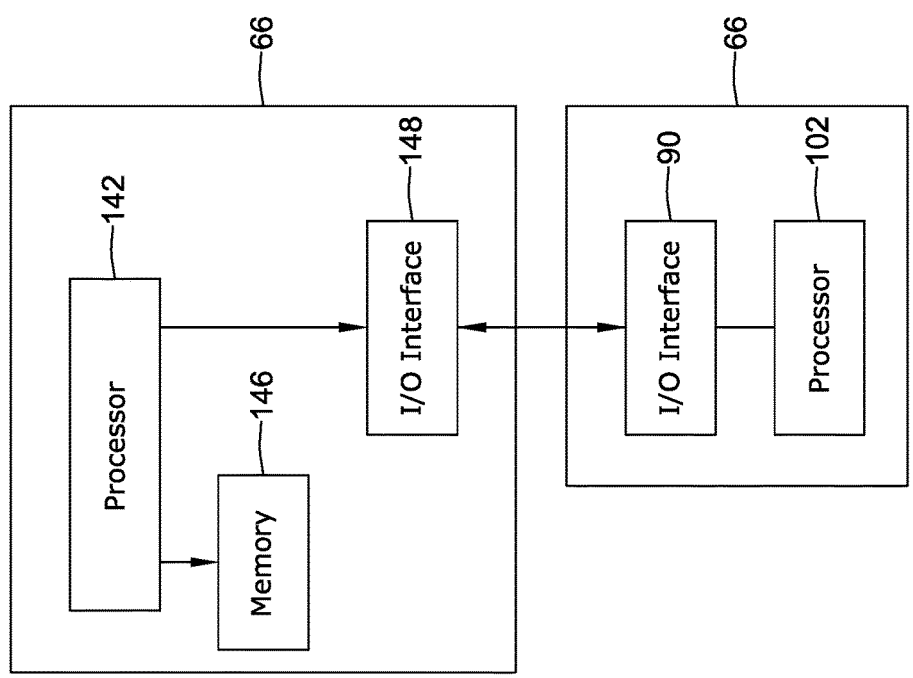
FIG. 9 is a schematic block diagram of an illustrative method for determining information to be displayed on the user interface of the wireless device used to access and/or control the HVAC system of FIG. 1.

As shown in FIG. 9, the server 66 may include a processor 142 (e.g., a microprocessor or other controller), memory 145, and an input/output interface 148, where the input/output interface 148 may be configured to receive the user actions and geo-locations and/or times associated with the user actions of the mobile wireless device 62 (and/or controller 18). In some instances, the server 66 via processor 142 may be configured to identify a pattern in the two or more user actions and the associated geo-locations and/or associated times. Once a pattern has been identified, such a pattern may be saved in memory 146 and/or sent to the mobile wireless device 62 (and/or controller 18). The server 66 may send and/or transmit information via the input/output interface 148 to the input/output interface 90 of the mobile wireless device 62 (and/or controller 18), and the mobile wireless device 62 (and/or controller 18) may receive such information. The information may be based, at least in part, on the identified pattern. In some cases, the sent and/or transmitted information may identify and/or indicate to the controller 102 of the mobile wireless device 62 (and/or controller 18) what building control information and/or other information to display on the user interface 98 thereof (and/or the user interface 68 of the controller 18.

In one example, the server 66 may receive a request from an application program code 106 running on a mobile wireless device 62 requesting information to be displayed. The request may include geo-location information (e.g. location stamp) of the mobile wireless device 62 and/or the time of day (e.g. time stamp) of the request. The processor 142 of the server 66 may apply the information in the request (e.g., geo-location, time information, and/or other information) to the identified pattern(s) in the user actions and associated geo-locations and/or associated times to determine what information should be displayed on a display 108 of the mobile wireless device 62. For example, the request from the application program code 106 on the mobile wireless device 62 may indicate the user's geo-location is the user's work location (e.g., either labeled as work or as coordinates, or otherwise labeled) and, based on an identified pattern in the user's prior actions and associated geo-locations, the server 66 may indicate a security camera view icon and a schedule icon for the user's home should be displayed on the display 108 of the mobile wireless device 62. This is just one example.

In some cases, the server 66 or other device with a controller or processor may receive from each of a plurality of users (e.g., where each user has a different user profile associated with one or more building control system) via the input/output interface 148, two or more user actions with a user's mobile wireless device 62 and geo-locations and/or times associated with those user actions. In some cases, user actions on one mobile wireless device 62 may be utilized in identifying a pattern in user actions and associated geo-locations and/or times when determining what information to display on a display 108 of a different user's mobile wireless device 62. In some cases, common behavior patterns may be identified by analyzing user actions of many users. These common behavior patterns may be applied to particular users (e.g. new users), sometimes with first obtaining permission from the particular user. That is, the processor 142 of server 66 or other processor (e.g., controller 102) may identify a multi-user pattern in the two or more user actions and the associated geo-locations and/or associated times received from a plurality of users. The multi user pattern may be saved in memory 146 and, optionally, updated over time as additional user actions and associated geo-locations and/or times are received.

In response to a request from a user's mobile wireless device 62, the server 66 or other device may send information to the mobile wireless device 62 via the input/output interface 148. The information sent to the mobile wireless device 62 may be based, at least in part, on the identified multi-user pattern and indicate to the mobile wireless device 62 (e.g., the application program code 106 on the mobile wireless device 62) what building control information to display on the user interface (e.g., display 108 or other user interface feature) of the user's mobile wireless device 62. Such identification of a multi-user pattern may be considered a multi-user approach for determining which information may be displayed on a display 108 of a mobile wireless device 62.

In some cases, the plurality of users may be associated with a common account. Alternatively, or in addition, two or more of the plurality of users may be associated with separate accounts and a pattern identified by controller 102, processor 142, or other processor/controller may be based on user actions and associated geo-locations and/or times from users associated with separate accounts.

In some cases, a controller 102 of a mobile wireless device 62 may be configured to receive information that identifies a custom-user approach for which building control information is to be displayed on the display 108 of a mobile wireless device 62. The information to be displayed may be based, at least in part, on a pattern of user actions of multiple other users and associated geo-locations and/or times, and/or based, at least in part, on user actions on the user's mobile wireless device 62 and associated geo-locations and/or times. Additionally, or alternatively, in a custom-user approach, a user may manually adjust what is to be displayed on the display 108 of the mobile wireless device 62 at various geo-locations of the mobile wireless device 62 and/or times (e.g., times of day, days of the week, months of the year, seasons of the year, and so on).

A multitude of examples of information to be displayed based on identified patterns in user actions and geo-locations of a user's mobile wireless device 62 and/or time of day/week/month/year are contemplated. In one example, if a geo-location of a user's mobile wireless device 62 is at home (e.g., the coordinates for "Home"), the identified pattern may indicate home automation controls (e.g., thermostat setpoints, humidity setpoints, lighting setpoints, etc.) should be displayed on the display 108 of the user's mobile wireless device 62. If a geo-location of a user's mobile wireless device 62 is at work (e.g., the coordinates for "Work") and it is a time of day that the user's children come home from school, the identified pattern may indicate a home security camera view should be displayed on the display 108 of the user's mobile wireless device 62. If a geo-location of a user's mobile wireless device 62 is at an unusual location (e.g., coordinates that are not associated with an identified pattern), the controller 102 or 142 may indicate a panic key should be displayed and/or provide information to be displayed on the display 108 of the user's mobile wireless device 62 based, at least in part, on a pattern identified from user of other users, which accounts for the current geo-location of the mobile wireless device 62 and/or the current time. In another example, when an identified pattern may indicate a user does not typically interact with the wireless mobile device at a particular geo-location or time, the controller 102 or 142 may enter a lower power mode, which may reduce the update rate of the information or other data to the user's mobile wireless device 62. These are just some examples.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respect, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A wireless device configured to communicate with and help control one or more building control components of a building control system, the wireless device comprising:
   a wireless interface for sending and receiving information;
   a memory;
   a location service for identifying current geo-locations of the wireless device;
   a user interface including a display; and
   a controller coupled to the wireless interface, the memory, the location service, and the user interface, the controller configured to:
      accept two or more user actions via the user interface;
      for each of the two or more accepted user actions, identify a current geo-location of the wireless device via the location service of the wireless device and associate the current geo-location with the corresponding accepted user action; and
      display building control information on the display, wherein the building control information that is displayed is adapted based at least in part on a pattern that is identified in the two or more accepted user actions and the associated geo-locations.

2. The wireless device of claim 1, wherein the controller is further configured to:
   for each of the two or more accepted user actions, associate a current time with the corresponding user action; and
   wherein the building control information that is displayed is adapted based at least in part on a pattern that is identified in the two or more accepted user actions, the associated geo-locations, and the associated times.

3. The wireless device of claim 1, wherein the controller is configured to transmit each of the two or more accepted user actions along with their associated geo-locations to a remote server via the wireless interface, wherein the remote server identifies the pattern in the two or more accepted user actions and the associated geo-locations.

4. The wireless device of claim 3, wherein the controller is configured to receive information from the remote server via the wireless interface that identifies which building control information to display on the display based at least in part on the pattern that is identified in the two or more accepted user actions and the associated geo-locations.

5. The wireless device of claim 1, wherein the controller is configured to receive information that identifies a multi-user approach for which building control information is displayed on the display that is based at least in part on a pattern of user actions on other wireless devices and geo-locations associated with each of the user actions on the other wireless devices.

6. The wireless device of claim 1, wherein the controller is configured to receive information that identifies a custom-user approach for which building control information is displayed on the display that is based at least in part on a pattern of user actions on other wireless devices and geo-locations associated with the user actions on the other wireless devices.

7. The wireless device of claim 1, wherein one or more of the associated current geo-locations include a static geo-location.

8. The wireless device of claim 1, wherein one or more of the associated current geo-locations include a dynamic in geo-location.

9. The wireless device of claim 1, wherein to adapt the building control information that is displayed, the pattern that is identified in the two or more accepted user actions and the associated current geo-locations is updated as more user actions are accepted and associated current geo-locations are retrieved.

10. A wireless device configured to communicate with and help control one or more building control components of a building control system, the wireless device comprising:
   a wireless interface for sending and receiving information;
   a memory;
   a location service for identifying current geo-locations of the wireless device;
   a user interface including a display; and
   a controller coupled to the wireless interface, the memory, the location service, and the user interface, the controller configured to:
      accept two or more user actions via the user interface;
      for each of the two or more accepted user actions, identify a current time and associate the current time with the corresponding user action;
      display building control information on the display, wherein the building control information that is displayed is adapted based at least in part on a pattern that is identified in the two or more user accepted actions and their associated times.

11. The wireless device of claim 10, wherein the controller is configured to transmit each of the accepted two or more accepted user actions along with their associated times to a remote server via the wireless interface, wherein the remote server identifies the pattern in the two or more user accepted actions and their associated times.

12. The wireless device of claim 11, wherein the controller is configured to receive information from the remote server via the wireless interface that identifies which building control information to display on the display based at least in part on the pattern that is identified in the two or more accepted user actions and the associated times.

13. The wireless device of claim 10, wherein the controller is configured to receive information that identifies a multi-user approach for which building control information is displayed on the display that is based at least in part on a pattern of user actions on other wireless devices and times associated with each of the user actions on the other wireless devices.

14. The wireless device of claim 10, wherein the controller is configured to receive information that identifies a custom-user approach for which building control information is displayed on the display that is based at least in part on a pattern of user actions on another wireless devices and/or times associated with the user actions on the other wireless devices.

15. The wireless device of claim 10, wherein one or more of the associated current times is a discrete time.

16. The wireless device of claim 10, wherein one or more of the associated current times is an elapsed amount of time.

17. The wireless device of claim 10, wherein to adapt the building control information that is displayed, the pattern that is identified in the two or more accepted user actions and the associated times is updated as more user actions are accepted and their associated current times are received.

18. A system for adapting building control information displayed on a display of a wireless device, wherein the wireless device includes a user interface configured to control one or more building control components of a building control system, the system comprising:
   a server comprising:
      a processor;
      memory in communication with the processor, the memory storing received user actions on wireless devices and associated data, along with instructions executable by the processor for controlling building control information displayed on a user's wireless device;
      an input/output interface;
   wherein:
      the server is configured to receive, via the input/output interface, two or more user actions with a user interface of a user's wireless device and corresponding geo-locations that each represent the geo-location of the wireless device when the corresponding one of the user actions were made;
      the server is configured to identify a pattern in the two or more user actions and the corresponding geo-locations; and
      the server is configured to send information to the wireless device via the input/output interface, wherein the information is based at least in part on the identified pattern and indicates to the wireless device an arrangement of building control information to display on the user interface of the user's wireless device.

19. The system of claim 18, wherein the server is further configured to:
   for each of the two or more user actions, receive, via the input/output interface, a time associated with the corresponding user action; and
   wherein the identified pattern is a pattern in the two or more user actions, the associated geo-locations, and the associated times.

20. The system of claim 18, wherein the server is further configured to:
   receive from each of a plurality of users, via the input/output interface, two or more user actions with a corresponding user's wireless device and geo-locations associated with those user actions;
   identify a multi-user pattern in the two or more user actions and the associated geo-locations received from the plurality of users; and
   send information to the wireless device via the input/output interface, wherein the information is based least in part on the identified multi-user pattern and indicates to the wireless device an arrangement of building control information to display on the user interface of the user's wireless device.

* * * * *